Oct. 10, 1933.  W. P. CRILLY  1,930,160
REMOTE CONTROL SYSTEM FOR RADIO INSTRUMENTS AND THE LIKE
Filed Nov. 16, 1929  6 Sheets-Sheet 1

Inventor
William P. Crilly

Attorney.

Oct. 10, 1933.                W. P. CRILLY                    1,930,160
           REMOTE CONTROL SYSTEM FOR RADIO INSTRUMENTS AND THE LIKE
                    Filed Nov. 16, 1929            6 Sheets-Sheet 2

Inventor.
William P. Crilly.

Attorney.

Oct. 10, 1933.   W. P. CRILLY   1,930,160
REMOTE CONTROL SYSTEM FOR RADIO INSTRUMENTS AND THE LIKE
Filed Nov. 16, 1929   6 Sheets-Sheet 3

Inventor.
William P. Crilly

Attorney.

Oct. 10, 1933.     W. P. CRILLY     1,930,160
REMOTE CONTROL SYSTEM FOR RADIO INSTRUMENTS AND THE LIKE
Filed Nov. 16, 1929     6 Sheets-Sheet 5

Inventor
William P. Crilly.

Attorney.

Oct. 10, 1933.   W. P. CRILLY   1,930,160
REMOTE CONTROL SYSTEM FOR RADIO INSTRUMENTS AND THE LIKE
Filed Nov. 16, 1929   6 Sheets-Sheet 6

Inventor
William P. Crilly

Attorney.

Patented Oct. 10, 1933

1,930,160

UNITED STATES PATENT OFFICE 1,930,160

REMOTE CONTROL SYSTEM FOR RADIO INSTRUMENTS AND THE LIKE

William P. Crilly, Los Angeles, Calif.

Application November 16, 1929
Serial No. 407,673

26 Claims. (Cl. 250—40)

This invention relates generally to systems for controlling instruments such as radio receiving sets, although the invention is not limited to that specific application; the general object of the invention being to provide a system by means of which such an instrument may be set quickly and accurately, and particularly may be set by remote control.

Since the value of the invention resides at present chiefly in its application to radio receiving sets, the invention will hereinafter be illustrated and described in that particular aspect, from which the features and characteristics of the invention itself will become readily apparent.

Reference is here made to my copending application entitled Remote control systems for radio instruments and the like, Ser. No. 311,496 filed October 10th, 1928, in which is disclosed my original control system. The invention described in that original application is similar in many respects to the present invention, and the original application includes claims generic to both systems.

Generally speaking, the system, as applied to a radio receiving set, embodies a setting mechanism in or at the radio set which is adjustable to predetermined selected settings, and which, after proper original adjustments, may be selectively actuated from a remote control station to set the instrument in any one of the previously selected settings. This broad characterization applies to my above referred original system as well as to the present system, which, although in many respects closely analogous to the original, embodies improvements directed toward simplification and practicability.

The details of the arrangement embodied in the present invention may be discussed to best advantage in the following specification, wherein various additional objects and features will become apparent from a detailed description of a present preferred embodiment of the invention, reference for this purpose being had to the accompanying drawings, in which:

Referring now to the drawings, the numeral 10 designates a shaft upon which is mounted the rotor of a condenser C and which may be taken as typifying the tuning element shaft of a typical radio receiving set; broadly speaking, however, the tuning element shaft of course may or may not directly carry the tuning element or elements of the set, and in the present meaning refers simply to a shaft controlling the tuning of the set. The letter D indicates a typical setting dial applied to shaft 10, by means of which the condenser of the receiving set is normally adjusted for purposes of setting the radio set to any desired wave length. Shaft 10 is shown journalled in the front panel P of the radio receiving set, and also in spaced vertical bearing plates 12 and 13, respectively, extending from an insulating base 14 mounted in the set.

Mounted on shaft 10 between bearing plates 12 and 13 is what I may generally term a tuning rotor 16, which embodies a number of spaced stop disks 17 mounted on the shaft, one for each station to be tuned in, and each disk having a stop lug 18.

Stop disks 17 are frictionally connected with shaft 10 for rotation therewith. For this purpose (Fig. 2) there may be provided a friction disk 20 having a hub 21 set tightly on shaft 10 and bearing against one face of the stop disk 17. Against the other face of the stop disk and confined between that disk and the friction plate 20 of the next stop disk is provided a split resilient spring or washer 22 which forces the stop disk with considerable pressure against the friction disk 20. The stop disks are thus each individually frictionally mounted upon shaft 10. The amount of friction is such that the stop disks 17 can be manually rotated relative to shaft 10 for initial adjustment, but will thereafter cause the stop disk to remain fixed on shaft 10 during normal operation.

Mounted parallel to shaft 10 and journalled in bearing plates 24 and 25 extending from base plate 14 is a selector shaft 26, carrying opposite the tuning rotor 16 what I may generally term a selector rotor 28.

The selector rotor embodies a number of disks 30 fixed on shaft 26 opposite the stop disks 17 on shaft 10, and spaced by collars 31. Pivoted to the outer edges of disks 30 opposite the stop lugs 18 on shaft 10 are selector stops 34, which extend radially outwardly from disks 30 (see Fig. 4). When shaft 26 has been so rotated that any one of the individual selector stops 34 is turned directly toward the tuning rotor (Fig. 4), then upon rotation of the tuning rotor in a right handed direction, as viewed in Figs. 3 or 4, for instance, a corresponding stop lug 18 will be brought up against the selector stop 34 to stop the tuning rotor and shaft in that position. The selector stops 34, which are pivoted to disks 30 at 35, are held against the stop lugs to prevent further rotation thereof by means of abutments 36 when the stop lugs contact therewith from right handed rotation, as viewed in Fig. 4; but the yielding tension springs 38 which normally hold the stops up to position, permit the stops to pivot to the dotted line position of Fig. 4 so that the stop lugs 18 can pass without obstruction in left handed rotation. The selector stops 34 are equi-angularly spaced about shaft 26, the angle between adjacent stops being such that only one stop can take the operative stopping position of Fig. 4 at a time.

Figure 4:
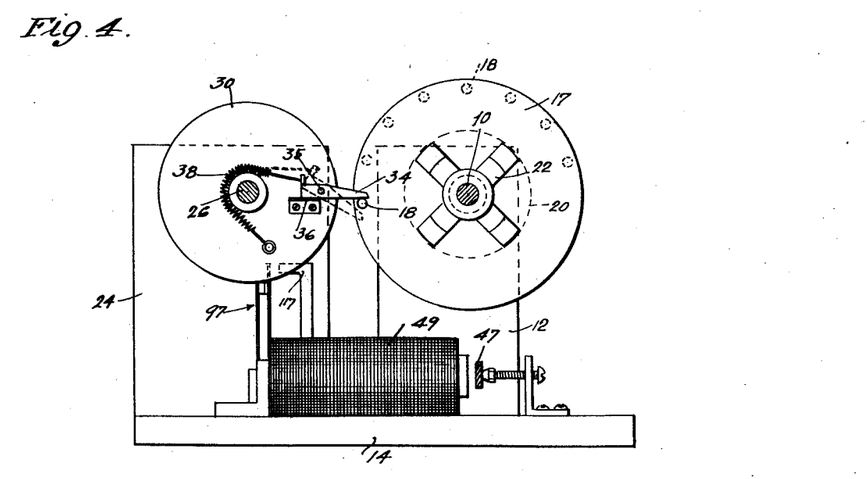
Fig. 4 is a transverse vertical section taken on line 4—4 of Fig. 2.

The initial positioning of the several stop disks on shaft 10 to correspond with the wave lengths of broadcasting stations to which the remote control system is to be adjusted, may now be understood. One of the selector stops 34 being moved to and held in the operative position illustrated in Fig. 4, as by means hereinafter to be described, the tuning element shaft 10 is rotated until the desired broadcasting station is brought in with the greatest intensity, and then, holding shaft 10 stationary, the corresponding stop disk 17 is rotated until its stop lug 18 brings up against the selected stop (Fig. 4). The other selected stops and corresponding stop disks are set similarly for other broadcasting stations. The subsequent operations, hereinafter to be described, of bringing the stop disks 17 back to the positions in which their stop lugs 18 bring up against the selector stops 34, then bring the tuning element shaft 10 to the previously adjusted positions, as will be understood.

It may be preferable to provide means for positioning the stop disks on the shaft as described in my copending patent application, above referred to; or a further method for accomplishing this object is as follows: A selector stop is first moved to the operative position of Fig. 4, in which position it will be automatically held until released by means hereinafter to be described. The corresponding stop lug 18 is then brought into engagement with the selector stop in right handed rotation as viewed in Fig. 4, by means of the knob on the setting dial D attached to shaft 10. The stop lug on the disk 17 is thus made to engage its selector stop, and the shaft 10 then further rotated by means of dial D until the desired broadcasting station is tuned in, the friction disk 17 thus being held stationary while the shaft 10 is advanced to the position which will bring in the desired station. That particular stop disk and lug are then adjusted to one broadcasting station; and the following operations of bringing the disk around so that its lug will engage and be stopped by its selector stop 34 will then automatically tune in the same broadcasting station. Corresponding operations are of course carried out to adjust the other sets of stop lugs and selector stops to other broadcasting stations.

One form of drive for the tuning element shaft 10 is shown in Figs. 2, 3, 7 and 8. According to the arrangement there illustrated, the rear end of shaft 10 carries a pair of ratchet disks 40 and 41 having oppositely pointing ratchet teeth about their respective peripheries. Ratchet disks 40 and 41 are respectively actuated to rotate shaft 10 in opposite directions by pawls 42 and 43 extending oppositely from a common hub 44 pivoted at 45 to the upwardly extending arm of a bracket 46. Bracket 46 is carried upon the free vibrating end of the armature 47 of an electromagnet 49 (Fig. 7), armature 47 being pivoted at 48 to the insulating base plate 14, and the horizontal vibration of the armature and bracket causing actuation of the pawls. Electro-magnet 49 intermittently pulls the armature over against an opposing tension spring 50 (see Fig. 7), which spring returns the armature when it is released by the magnet; the magnet being intermittently energized through a vibrator switch 51 having one of its contacts mounted on the armature, and operated by the vibratory motion of the armature itself, as will be understood.

Hub 44 has a depending arm 55, to the lower end of which is connected a tension spring 56, and spring 56 is attached at its upper end to an arm 57 of bracket 46. The two oppositely extending pawl arms 42 and 43 are resiliently held in either the full or dotted line positions of Fig. 3 by means of spring 56, as will be apparent from inspection of that figure. Vibration of the pawl carrying bracket 46 with armature 47 due to intermittent energization of magnet 49, will then cause whichever pawl is at the time in operative engagement with the teeth of its ratchet disk, to ratchet that disk around; and it will be understood that when the pawls are in the full line position of Figure 3 pawl 42 will cause right handed rotation of shaft 10, and when the pawl arms are in the dotted line position pawl 43 will cause left handed rotation of shaft 10.

Figure 3:
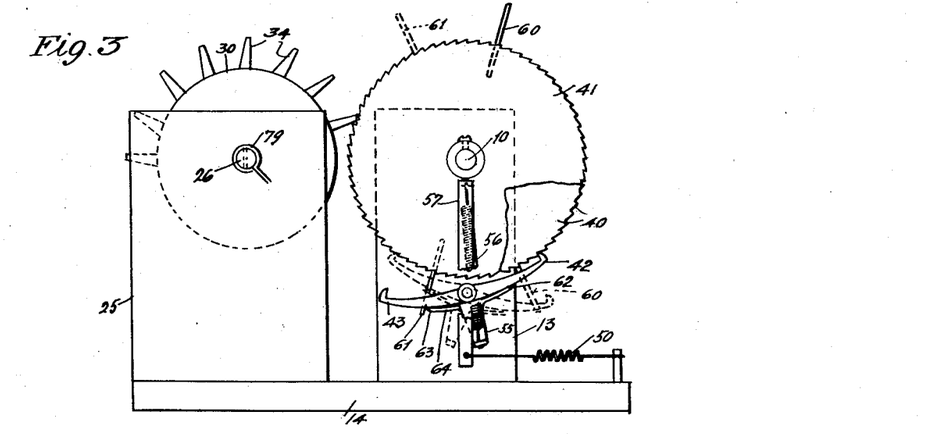
Fig. 3 is a rear end elevation of the apparatus shown in Fig. 1.

Means are provided for shifting the pawl arms between the two positions indicated in Fig 3 at certain times, to reverse the direction of rotation of shaft 10, for a purpose which will appear later. For this purpose, disk 40 carries a pair of pins 60 and 61, which are adapted when the disk reaches predetermined positions to engage the ends 62 and 63 respectively of a reversing plate 64 fastened to hub 44 and the pawl arms to shift the pawl arms between the two reverse operative positions illustrated. Thus when the pawls are in the full line position of Fig. 3, being also the position of Fig. 8, right handed rotation in Fig. 3, indicated by the arrow in Fig. 8, will cause pin 60 to move down into contact with the end 62 of the reversing plate and cause the reversing plate to be moved over toward the dotted line position of Fig. 3. As soon as the reversing plate and pawls have passed the center positions then the snap action of the spring 56 acting on arm 55, which is attached to the reversing plate and pawls, causes the reversing plate and pawls to snap over to the dotted line position of Fig. 3, which is the position opposite that shown in Fig. 8. The reverse action will take place when the ratchet disks are being rotated left handedly in Fig. 3, when the pawls will be snapped back to the full line position of Figs. 3 and 8. The pins 60 and 61 are so placed that these two reversing actions take place at the ends of the total rotary movement desired in the condenser shaft 10, usually about 180 degrees.

Figure 5:
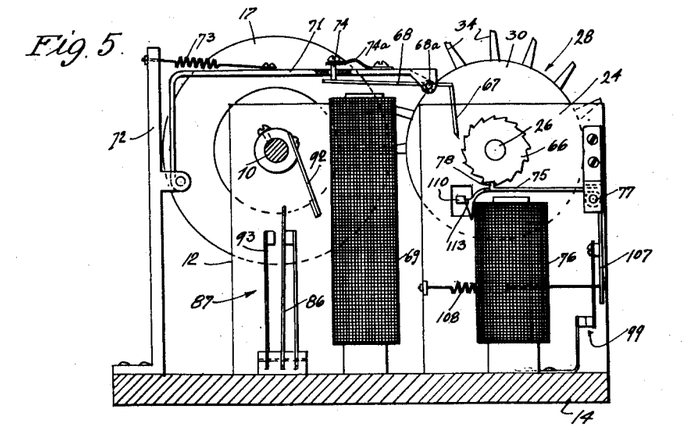
Fig. 5 is a transverse vertical section taken on line 5—5 of Fig. 2.
Figure 6:
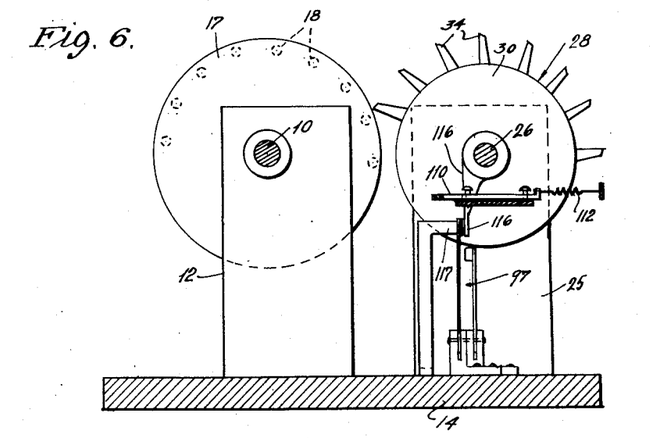
Fig. 6 is a transverse vertical section taken on line 6—6 of Fig. 1.
Figure 7:
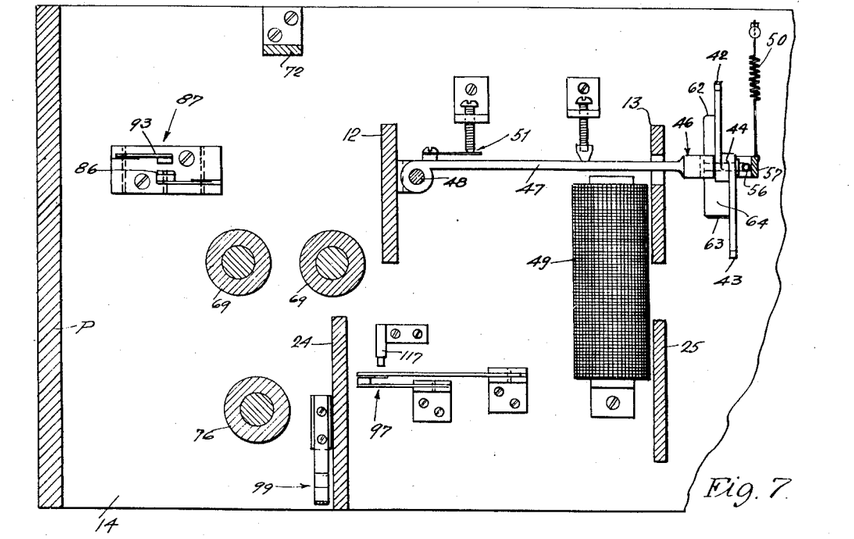
Fig. 7 is a horizontal section taken on line 7—7 of Fig. 2.
Figure 8:
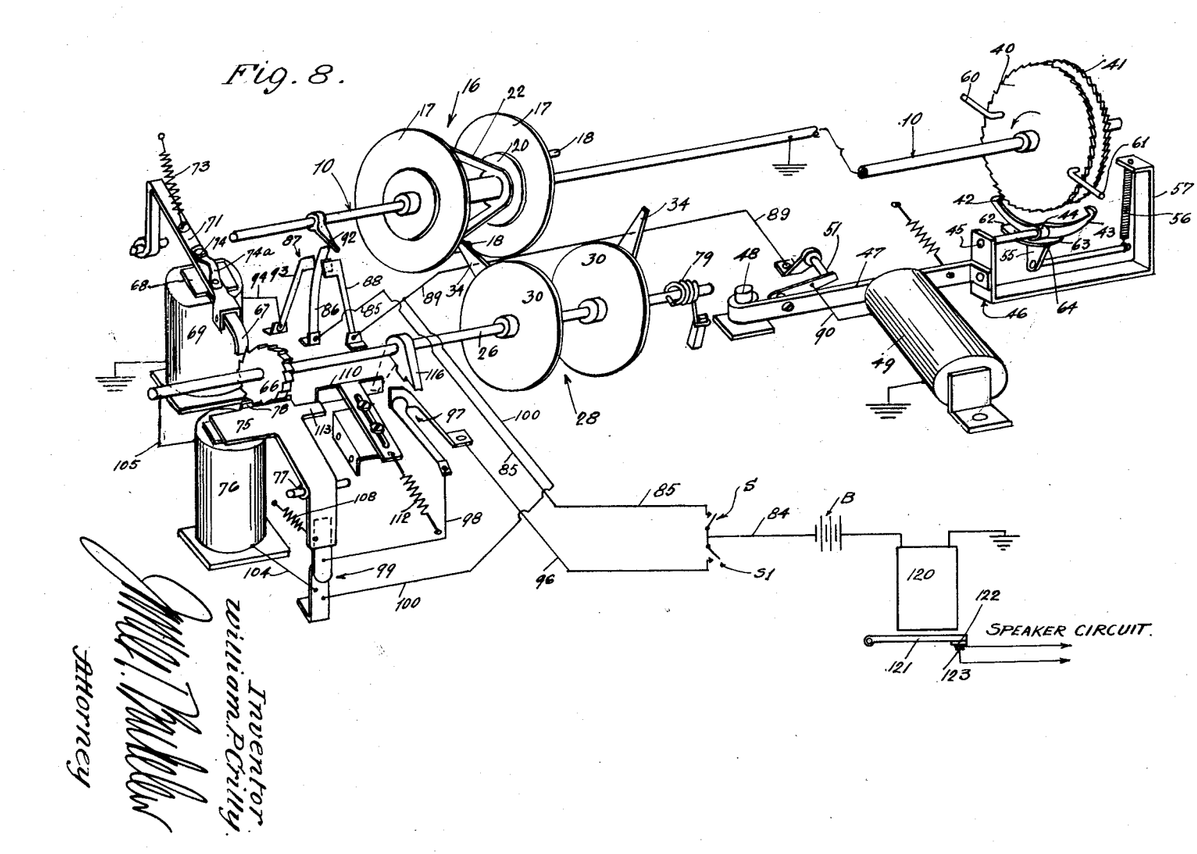
Fig. 8 is a perspective diagram of the apparatus somewhat simplified and with elements spread apart for clarity of illustration, and showing the electrical connections thereof.

Shaft 26, upon which the selector rotor 28 is mounted, is adapted to be rotated step by step in a left handed direction, as viewed in Figs. 5 and 8 (right handed as viewed in Figs. 3 and 4), by means of a ratchet wheel 66 mounted on its forward end, and a pawl 67 extending from the pivoted armature 68 of an electromagnet 69. Armature 68 is pivoted at 68a to a supporting arm 71 which is pivoted to a frame member 72, and said arm 71 is yieldingly held in its upper position by means of a tension spring 73 also connected to frame member 72. The rear end of the armature has a pin 74 which is acted upon by a spring 74a attached to arm 71 to resiliently hold the armature normally up against the arm 71, in which position pawl 67 is moved out of the path of the ratchet wheel 66. When magnet 69 is energized, spring 74a first bends as the armature is pulled down and pawl 67 moves into position to engage the ratchet wheel; and then as the armature further descends arm 71 is pulled down against spring 73, while pawl 67 ratchets wheel 66 around one step. When magnet 69 is then deenergized, arm 71 rises due to springs 73, and armature 68 is pulled up against it by spring 74a, the pawl 67 being thereby taken out of the path of the ratchet wheel to allow its return at the proper time. The provision of the pivoted resilient mounting of armature 68 on arm 71 allows the pawl to be taken out of the path of the ratchet wheel without excessive movement of the armature away from its magnet.

Figure 1:
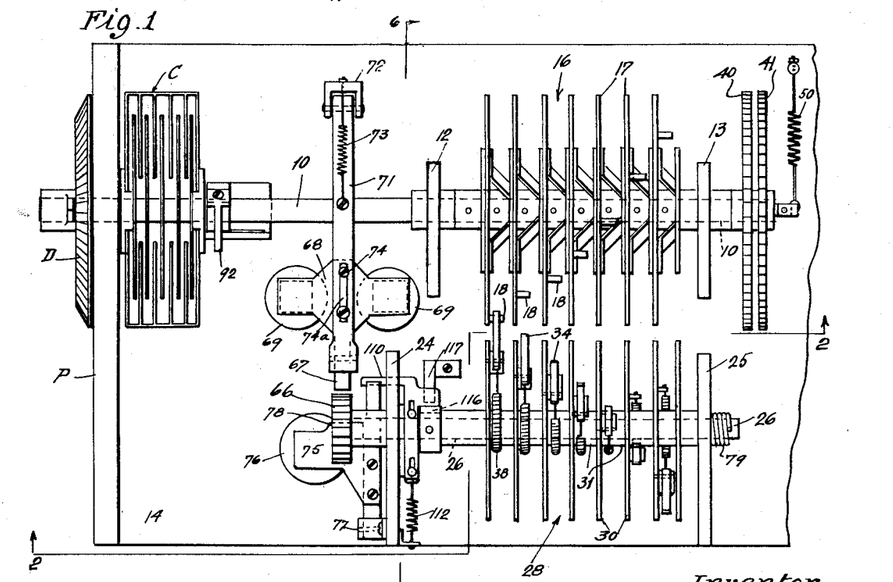
Fig. 1 is a top plan view of a present embodiment of the invention, indicating its application to a typical tuning element of a radio receiving set.
Figure 2:
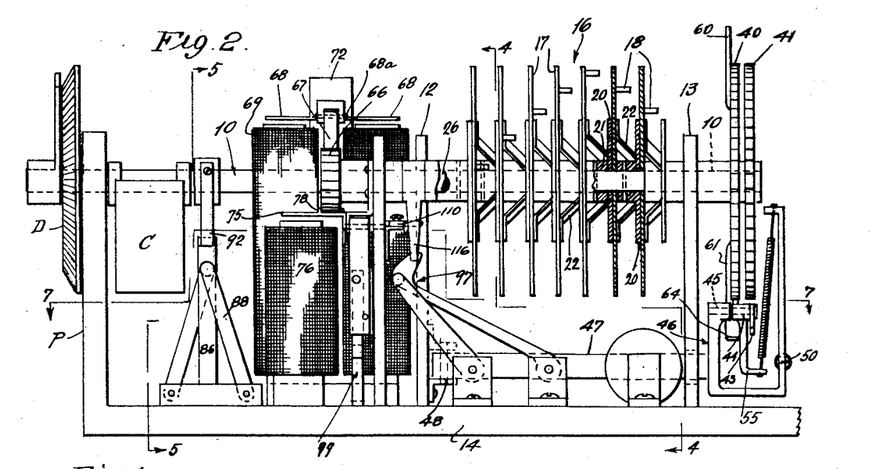
Fig. 2 is a side elevation, partly in section, being a view taken on the line 2—2 of Fig. 1.

Figs. 2 and 5 show the selector shaft in its original or neutral position, in which all of selector stops 34 are removed from operative stopping position. The first actuation of ratchet wheel 66 by pawls 67 rotates the shaft 26 to such a position that one of the selector stops is carried to the operative stopping position (Fig. 4), the second actuation carrying the next selector stop to operative position, and so on, the number of actuations of the ratchet wheel thus determining which of the selector stops is to be moved to position to stop the rotation of the tuning element shaft. It will be remembered, however, that it is the position of the corresponding stop lug 18 on shaft 10 that actually determines the position at which shaft 10 is finally stopped.

The armature 75 of an electro-magnet 76 (see Fig. 5) is pivoted at 77 to frame plate 24, and has an upwardly turned detent edge 78 adapted to engage the teeth of ratchet wheel 66; the detent 78 being withdrawn from the ratchet wheel when armature 75 is pulled downwardly due to energization of its magnet 76, as hereinafter to be explained. The function of detent 78 is to prevent retrograde movement of the selector shaft as it is ratcheted around and until the selector shaft is manually released to return to its initial position.

A spring, such as illustrated at 79, is provided on the other end of shaft 26 and serves to bring shaft 26 back through right handed rotation, as viewed in Fig. 5, to its original or neutral position when detent 78 releases the ratchet wheel. The stop which limits the spring action and defines the initial position of the selector shaft is included in the mechanism which releases detent 78 as the selector shaft comes to its initial position, as hereinafter set forth.

The balance of the apparatus will now be described in connection with a description of a complete operation of the system. A previous setting of the device to a wave length of a broadcasting station leaves the system in such a position as is illustrated in Figs. 1, 2, 5 and 3 (full line), the selector rotor being returned by spring 79 to neutral position with all of the selector stops removed from the paths of the stop lugs 18 on disks 17 (see Fig. 3), the tuning rotor remaining set to the last station with a stop lug 18 remaining in the position in which it was stopped by its stop lug 34, and the pawl arms being in the full line position of Fig. 3. The direction of rotation which has brought stop 18 up against its stop 34 has been in a direction right handedly in Fig. 3 (left handedly in Fig. 8), but typically through an angle of rotation less than the complete rotational limit of shaft 10. How the parts originally arrived at these positions will become more fully apparent from the following description of a complete cycle of operation.

Reference is now had to the perspective diagram of Fig. 8, in addition to Figs. 1 to 7 inclusive. To tune in a selected broadcasting station, the manual control switch S is first closed once, switch S being illustrated in Fig. 8 as a simple switch, but shown in detail in Figs. 12 to 14 inclusive. One side of switch S is connected by means of wire 84 to a battery B, the other side of which is connected through an electromagnet 120 to ground. The other side of switch S is connected by a wire 85 to the resilient center arm 86 of a three pole switch 87. For the structure and placement of switch 87 see Fig. 5. The center arm 86 of this switch is normally in contact with the switch arm 88, which is connected by wire 89 to one side of the vibrator switch 51. The other side of switch 51 is connected by wire 90 with one side of electro-magnet 49, the other side of which is grounded. Closing of switch S thus forms a circuit from battery B through wire 84, switch S, wire 85, switch arms 86 and 88, wire 89, switch 51, wire 90, and magnet 49 to ground, thereby energizing magnet 49 and causing its armature 47 to vibrate, as previously described. This motion of armature 47 causes the pawl arm 42, then in contact with its ratchet disk 40, to ratchet the disk around in a left handed direction as viewed in Fig. 8 (right handed in Fig. 3). This continues until the pin 60 of disk 40 has brought up against the end 62 of the reversing plate attached to the pawl arms, and thereby throws the pawl arms from the full line to the dotted line position of Fig. 3. Armature 47 continuing to vibrate, pawl 43 then comes into operation to ratchet its disk 41 around left-handedly as viewed in Fig. 3, or right-handedly in Fig. 8. This action continues until the pin 61 engages the end 63 of the reversing plate, throwing the pawl arms back to the full line position of Fig. 3 in which the mechanism is again set for right handed rotation in that figure (left handed in Fig. 8). At the same time the rotating shaft 10, on which disks 40 and 41 are fixed, brings a switch actuating arm 92 carried at its forward end, and which arm may be composed of insulating material, into engagement with the center arm 86 of switch 87 and moves it away from arm 88 and over into contact with the third arm 93 of that switch, breaking the circuit between switch arms 86 and 88 to deenergize vibrator magnet 49 and stop rotation of shaft 10 in the last described position, with the pawl arms shifted to reverse its direction of rotation when magnet 49 is again energized.

The same operation causes a circuit to be formed from the ungrounded side of battery B through wire 84, switch S (still held closed), wire 85, switch arm 86, switch arm 93, and wire 94 to magnet 69, the other side of which is grounded. Magnet 69 being thus energized, its armature 68 is pulled down and the pawl 67 extending therefrom actuated to ratchet the wheel 66 around one step, thereby carrying the first selector stop 34 into operative position. Detent 78 then acts as previously explained to hold the ratchet wheel 66 in its set position against the return spring 79.

Further successive closures of the switch S will then ratchet shaft 26 around step by step, bringing successive selector stops 34 into operative position in which they can be contacted by the lugs 18 of the corresponding stop disks 17.

When switch S has been actuated the proper number of times to carry the selected selector stop to operative position, then, with switch S open, switch S₁ is closed, which causes a circuit to be formed from the ungrounded side of battery B through wire 84, switch S₁, a wire 96, a switch 97 (then closed), wire 98, a switch 99 (then closed), wire 100, wire 89, vibrator switch 51, wire 90 and magnet 49 to ground. Magnet 49 being thus again energized, armature 47 is set into vibration and pawl 43, which is then in contact with its disk 41, acts to ratchet the disk around in a right handed direction, as viewed in Fig. 8. This rotation continues until the disk 17 corresponding to the particular selector stop 34 which has been left in operative position, as explained above, has brought its stop lug 18 up against that selector stop 34. A circuit is then formed by the contact of selector stop 34 with stop lug 18, from the ungrounded side of battery B through wire 84, switch S₁, wire 96, switch 97 (then closed), wire 98, switch 99 (then closed), wire 104, magnet 76, wire 105, shaft 26, selector disk 30 and stop 34, stop lug 18 and disk 17, and shaft 10 to ground. Magnet 76 being thus energized, armature 75 is pulled down and detent 78 withdrawn from the ratchet wheel 66, and shaft 26 returns immediately to its original or neutral position under the actuation of spring 79. The upper arm of switch 99, through which the circuits to both magnets 76 and 49 were formed, is carried by a depending leg 107 (Fig. 5) of the pivoted armature 75, the switch 99 being held normally closed and the armature 75 normally up with its detent edge 78 in engagement with ratchet wheel 66, by means of a tension spring 108 connected between the armature leg 107 and the frame plate 24. Thus when armature 75 is pulled down by magnet 76 switch 99 is opened, which breaks the battery circuit to both magnets 49 and 76.

Thus immediately the stop lug 18 comes up against the selector stop 34, the electrical current which is feeding the driving mechanism for shaft 10 and thus causing rotation of the stop lug, is cut off; and also detent 78 releases ratchet wheel 66 to allow selector shaft 26 to return to its neutral position. The operation of pulling armature 75 down to magnet 76, however, causes switch 99 to open, as described above, and therefore deenergizes magnet 76, which without counter provisions would allow armature 75 instantly to rise due to the action of spring 108, and detent 78 therefore to catch the ratchet wheel 66 before it has been given time to completely return to its original neutral position. But armature 75 is prevented from thus rising immediately that coil 76 is deenergized and before ratchet 66 gets back, by a detent 110 slidably mounted back of wall 24, and which is adapted, by virtue of the action of a tension spring 112, to slip over a shoulder 113 of armature 75 when the armature is pulled down by magnet 76. Thus when the magnet 76 releases the armature, the armature temporarily remains down due to the detent 110 which has slipped over its shoulder 113.

Shaft 26 has just back of plate 24 an arm 116 which in the return rotation of the shaft 26 is finally stopped by stop 117 to halt the shaft in its original or neutral position. Just before reaching stop 117 (see particularly Figs. 1 and 2), however, arm 116 engages a shoulder of detent 110 to move the detent rearward and off of the armature shoulder 113, thereby releasing the armature and allowing it to rise. Also just before reaching stop 117, arm 116, which may be of insulating material, engages one of the arms of switch 97 (Fig. 6), moving that arm back to open the switch until the selector shaft 26 is again ratcheted forward. The arm 116 pushes the switch arm back against stop 117, and is in this manner stopped in its neutral position.

The open switch 97 is required due to the fact that switch 99 was closed when shaft 26 reached its neutral position and armature 75 thereby released, which would therefore otherwise form a circuit from switch 99 through wire 100, wire 89, switch 50, and finally to magnet 49, which obviously would start actuation of the ratchet mechanism controlled thereby.

This completes the cycle, the tuning element shaft 10 remaining set to the selected station and the selector shaft being returned to its original or neutral position; and the parts are all back in the first position originally described at the beginning of the cycle except that the tuning element shaft is now set to a new position.

The making and breaking of certain switches in the control system may cause an undesirable noise to be heard in the loud speaker of the radio set while the control system is in operation; and I may therefore prefer to make the following provisions for opening the electrical circuit to the loud speaker during the operation of the control system. Referring to Figure 8, the grounded wire of battery B includes the coil 120, the movable armature 121 of which carries an electrical contact 122 normally in contact with a stationary electrical contact 123, contacts 122 and 123 being in the electrical circuit of the speaker unit. When the control system is in operation coil 120 is energized and armature 121 therefore pulled up to break contacts 122 and 123 and thereby open the speaker circuit, so the speaker is dead during the operation of the remote control system. Armature 121 has sufficient inertia that it is sluggish and when once attracted by its magnet and switch 122, 123 is thereby opened, the switch will not be intermittently closed and opened by the intermittent current caused by the vibrator switch 51.

Figure 9:
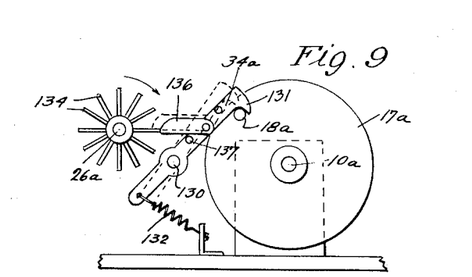
Fig. 9 is a perspective diagram showing a variational means for driving the tuning element shaft.
Figure 10:
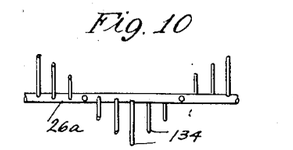
Fig. 10 is a view similar to Fig. 4, but showing a variational embodiment of the device.

Fig. 9 shows a variational embodiment of the selector device, this view being a section similar to Fig. 4. In this case there are again provided friction disks, indicated at 17a, and stop lugs 18a. The selector stops 34a, however, are not mounted on the selector shaft, but are mounted on a fixed shaft 130. The selector stops have hooked ends 131 adapted to be engaged by the stop lugs when the selector stops are moved to operative position, as illustrated in the full lines of the figure; while a spring 132 fastened at one end to the frame and at the other end to the stop arm, constantly urges the stop arm toward its inoperative position, illustrated in the dotted lines. Spaced along shaft 26a opposite the several disks on shaft 10a and extending radially from shaft 26a are selector pins 134 (see Fig. 10), which are equiangularly spaced from one another about shaft 26a. These pins are adapted, during rotation of shaft 26a, to contact the ends of links 136 pivoted to selector arms 34a to move said arms to their operative stopping positions. Lugs 137 provided on the stop arms support the links 136 opposite the passing pins 134. As each pin 134 passes its corresponding selector arm during step by step rotation of shaft 26a, it first contacts with the link 136 and thereby moves the arm 34a forward to operative position, and then upon further rotation it releases the link and allows the selector arm to return due to spring 132 to its former inoperative position (Fig. 9 in dotted lines). Shaft 26a is of course stopped when the selected pin is positioned to hold the corresponding selector arm in operative stopping position, so that when shaft 10a is rotated the corresponding stop lug 18a will contact therewith, as before. Upon reverse rotation of the selector pins as the selector shaft is returning to original or neutral position, the pins contact with links 136; but the links being pivoted to arms 34a, are lifted in succession to let the pins pass and then drop upon lugs 137.

It may here be noted that for the purpose of certain of the claims the stop members 34a, 136 of the just described form of Fig. 9 may be referred to as the selector stops or stop devices and the shaft 26a, pins 134, etc., of that figure as the single selector stop moving member, and that for the other illustrated form of the invention (Fig. 8) members 34 are the stops or stop devices and carrier disks 30, selector shaft 26, etc., comprise the single selector stop moving member.

Figure 11:
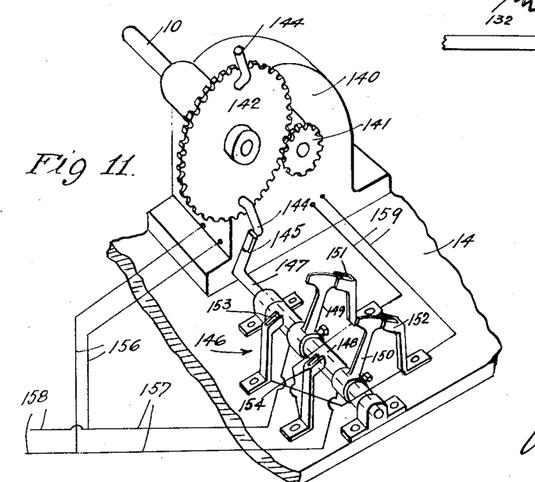
Fig. 11 is a side elevation of the selector shaft and pins of the embodiment of Fig. 10.

In Fig. 11 is illustrated a typical arrangement whereby an electric motor may be utilized for driving the tuning element shaft 10. An electric motor, designated at 140, drives a pinion 141 meshing with a gear 142 on tuning element shaft 10. Gear 142 carries a pair of radially extending reversing pins 144 which are adapted to engage a swinging switch control arm 145 for actuation of a double pole, double throw reversing switch 146 for motor 140. A typical switch for this purpose has a shaft 147, from which the control arm 145 extends, mounted parallel to shaft 10 in suitable bearings secured to base 14. An insulating sleeve 148 surrounding shaft 147 and fixed thereto, carries a pair of switch arms 149 and 150. Switch arms 149 and 150 are adapted to rock by rotation of shaft 147 due to actuation by the engagement of a pin 144 with arm 145, between contacts 151 and 152, and 153 and 154 respectively. The armature and field circuits 156 and 157 of the motor 140 are paralleled across the current supply circuit 158, and the reversing switch 146 may be placed in either circuit 156 or 157, being here shown in the field circuit 157. Thus wires 157 for the field of the motor are connected across switch arms 149 and 150. The pairs of contacts 151, 152 and 153, 154 are connected together in crossed relation, and one of the pairs of contacts are then connected by leads 159 to the motor, as in any current reversing switch. It will then be obvious how when the switch arms are in contact with one pair of contacts and the motor is driving gear 142 in one direction, a pin 144 will finally be brought up against arm 145 and cause it to swing across to carry the switch arms from one pair of contacts to the other, when the current relations in the motor will be reversed and the motor will immediately rotate in the reverse direction. The application of such an arrangement to the control system will be understood without further explanation.

Figure 12:
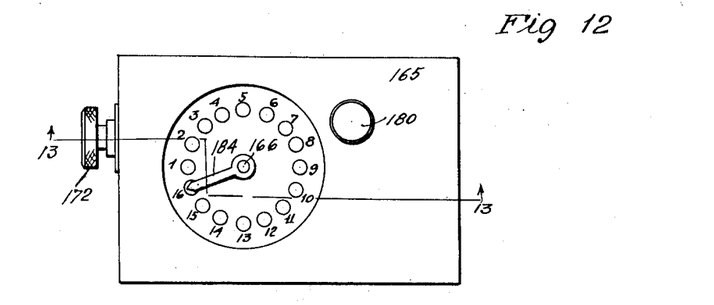
Fig. 12 is a top plan view of the switch.
Figure 13:
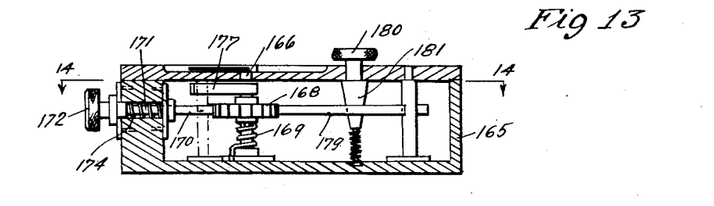
Fig. 13 is a section taken on line 13—13 of Fig. 12.
Figure 14:
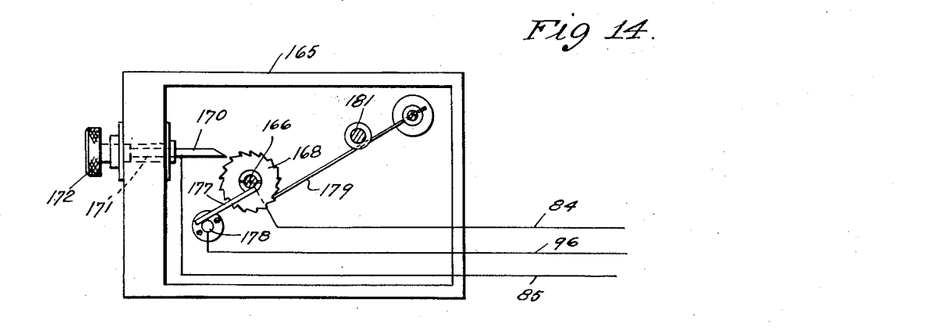
Fig. 14 is a section taken on line 14—14 of Fig. 13.

In Fig. 8 the switches S and S₁ have been merely diagrammatically illustrated in order that a clear description of operation might be given regarding the other parts of the system. The preferred embodiment of switches S and S₁ is shown in Figs. 11, 12 and 13. The numeral 165 illustrates the case of the switch, the walls of which journal a transverse stud 166 upon which is fixed a ratchet wheel 168. A return spring 169 is coiled about stud 166 so that after ratchet wheel has been ratcheted forward and then released, it will immediately return to its starting position, which position is illustrated in Figure 14. Ratchet wheel 168 is actuated by means of a pawl 170 which is on the end of a push rod 171 extending through the wall of case 165 and having on its outer end a push button 172. A spring 174 provided about shaft 171 returns the pawl to the position illustrated after each forward or ratcheting stroke. The ratchet wheel 168 carries an electrical contact 177 which closes with a stationary contact 178 while the ratchet wheel is in the initial or starting postion illustrated in Fig. 14. A detent 179 is provided for the ratchet wheel, and holds the ratchet wheel against return by spring 169 until released by depression of a push button 180 which actuates an inverted conical cam member 181 against the side of the detent to move the detent out of contact with the ratchet teeth.

Stud 166 extends through the top side of case 165, and carries at its upper end an indicator hand 184, which points to the numerals inscribed on a circular scale provided on the top of case 165, these numerals representing the broadcasting stations to which the control system is adjusted. The first actuation of push button 172 carries the hand to numeral 1, the second to numeral 2, and so on.

The electrical connections to the switch are as follows: The common battery wire 84 is connected to the ratchet wheel 168, and the wire 85 is connected to pawl 170. The wire 96 is connected to the stationary contact 178 which is closed with the moving contact 177 of the ratchet wheel whenever the ratchet wheel is in the initial or neutral position, as illustrated in Fig. 14. The contact between pawl 170 and ratchet wheel 168 corresponds to the switch S of Fig. 8, and the contact between stationary contact 178 and the movable contact 177 of the ratchet wheel corresponds to the switch S₁ of that figure.

To operate the system with the use of this switch, button 172 is first pressed once, which forms a circuit through the switch S of Fig. 8 and, the push button being held down for an instant, thereby causes shaft 10 to be rotated to its neutral position and shaft 26 to be ratcheted through one step, in the manner previously described. The selector shaft is then set to stop the tuning element shaft at a position which will tune in the first broadcasting station, and the indicator 184 of the switch points to station number 1.

Supposing it then to be required to tune in station number 4, for instance, button 172 will be pressed three more times, which will correspond to three additional contacts of switch S and will carry the indicator hand around to station number 4 on the switch dial. The three additional closures of switch S, of course, cause the selector shaft 26 to be ratcheted around three more steps, and the proper selector stop is therefore moved to position to stop rotation of the tuning element shaft at the wave length of broadcasting station number 4. The switch button 180 is then pressed once, which releases the detent and allows the ratchet wheel to return under the actuation of spring 169 to its original position, and as it reaches its original position contacts 177 and 178 are closed to form a circuit from the battery wire 84 through switch S₁ to wire 96. This operation thus corresponds to closing switch S₁ in the system of Fig. 8. The fact that switch S₁ is originally closed is of no consequence since at that time the switch 97 (see Fig. 8) is held open by the arm 116 of shaft 26. When the push button 180 is pressed, as just described, the shaft 26 is in such a position that its arm 116 is removed from switch 97, and switch 97 is therefore closed and permits the circuit therethrough to be closed when contacts 177 and 178 come together.

It will be recognized that the illustrative system specifically described herein is capable of considerable modification and rearrangement without departing from the spirit and scope of my invention; and it is therefore to be understood that the following claims embrace all such modifications and equivalent arrangements as may fairly be construed to fall within the scope of my invention.

I claim:

1. In a tuning system for a radio receiving set, which set includes an adjustable tuning element shaft; electro-magnetic means for rotating the shaft, a plurality of stop elements on and rotating with said rotating shaft, a corresponding plurality of selector stops, said selector stops movable to place any one stop in position to be engaged by and stop the corresponding one of the plurality of stop elements on the rotating tuning element shaft, a single selector moving member for moving the several selector stops to take such position one at a time, an electro-magnetic device for so operating said moving member, an electrical circuit for energizing the shaft rotating means, and a switch controlling said circuit.

2. In a tuning system for a radio receiving set, which set includes an adjustable tuning element shaft; electro-magnetic means for rotating the shaft, a plurality of stop elements on said shaft, a corresponding plurality of selector stops movable to engage corresponding stop elements, a single selector stop moving member for moving said selector stops successively into operative stopping position, an electro-magnetic device for so operating said moving member, a circuit for energizing said electro-magnetic device, a switch controlling said circuit, an electrical circuit for controlling the shaft rotating means, and a switch controlling the last mentioned circuit.

3. In a tuning system for a radio receiving set, which set includes an adjustable tuning element shaft; electro-magnetic means for rotating the shaft, a plurality of stop elements on said shaft, a corresponding plurality of selector stops movable to engage corresponding stop elements, magnetically actuated ratchet means for moving said selector stops successively into operative stopping position, means for controlling said ratchet means, an electrical circuit for energizing the shaft rotating means, and a switch controling said circuit.

4. In a tuning system for a radio receiving set, which set includes an adjustable tuning element shaft; electro-magnetic means for rotating the shaft, a plurality of stop elements on said shaft, a selector shaft, a plurality of selector stops corresponding to said stop elements and adapted by rotation of the selector shaft to be successively moved to positions to be engaged by corresponding stop elements on the rotating tuning element shaft, all in such a maner that said tuning element shaft is brought to a stop in predetermined positions by such engagements, and means for rotating the selector shaft.

5. In a tuning system for a radio receiving set, which set includes an adjustable tuning element shaft; electro-magnetic means for rotating the shaft, a plurality of stop elements on said shaft, a selector shaft, a plurality of selector stops corresponding to said stop elements and adapted by rotation of the selector shaft to be successively moved to positions to be engaged by corresponding stop elements on the rotating tuning element shaft, all in such a manner that said tuning element shaft is brought to a stop in predetermined positions by such engagements, and manually controllable step-by-step means for rotating the selector shaft.

6. In a tuning system for a radio receiving set, which set includes an adjustable tuning element shaft; electro-magnetic means for rotating the shaft, a plurality of stop elements on said shaft, a corresponding plurality of selector stops movable selectively to operative position to be engaged by corresponding stop elements, magnetically actuated ratchet means for so moving said selector stops, means for controlling said ratchet means, a detent in association with the ratchet means and acting to prevent return of the selector stops from operative position, and means for releasing said detent by virtue of engagement of a stop element with a selector stop.

7. In a tuning system for a radio receiving set, which set includes an adjustable tuning element shaft; electro-magnetic means for rotating the shaft, a plurality of stop elements on said shaft, a corresponding plurality of selector stops movable selectively to operative position to engage corresponding stop elements, a single manually controllable electro-magnetic means for so moving said selector stops, detent means for holding the selector stops in operative stopping position, means for releasing said detent upon engagement of a stop element with a selector stop, an electrical circuit for energizing the shaft rotating means, and a switch controlling said circuit.

8. In a tuning system for a radio receiving set, which set includes an adjustable tuning element shaft; means for rotating the shaft, a plurality of stop elements on said shaft, a selector shaft, a plurality of selector stops corresponding to said stop elements and adapted by rotation of the selector shaft to be selectively moved to position to be engaged by the corresponding stop elements on the rotating tuning element shaft, all in such a manner that said tuning element shaft is brought to a stop in predetermined positions by such engagements, magnetically actuated ratchet means for rotating said selector shaft step-by-step, means for returning the selector shaft to normal position, a detent in association with the ratchet means and acting to prevent the return rotation of the selector shaft, a magnet adapted when energized to release said detent, and a circuit for energizing said magnet, said circuit adapted to be automatically closed whenever a stop element engages a selector stop.

9. In a tuning system for a radio receiving set, which set includes an adjustable tuning element shaft; means for rotating the shaft, a plurality of stop elements on said shaft, a selector shaft, a plurality of selector stops corresponding to said stop elements and adapted by rotation of the selector shaft to be successively moved to position to be engaged by the corresponding stop elements on the rotating tuning element shaft, all in such a manner that said tuning element shaft is brought to a stop in predetermined positions by such engagements, magnetically actuated ratchet means for rotating said selector shaft step-by-step, means for returning the selector shaft to normal position, a detent in association with the ratchet means and acting to prevent the return rotation of the selector shaft, a magnet adapted when energized to release said detent, an energizing circuit for said magnet arranged to be closed by virtue of engagement of a stop element with a selector stop, another detent normally acting to hold the first detent in ratchet releasing position, and means actuated by the return of the selector shaft to neutral position for releasing the last mentioned detent.

10. In a tuning system for a radio receiving set, which set includes an adjustable tuning element shaft; a motor drive for the tuning element shaft, a motor energizing circuit, a switch in said circuit arranged to be opened by virtue of said shaft reaching a predetermined normal position, a second motor energizing circuit not including that switch, a plurality of stop elements on the tuning element shaft, a selector shaft, a plurality of selector stops corresponding to said stop elements and adapted by rotation of the selector shaft to be moved to operative position to be engaged by the corresponding stop elements on the rotating tuning element shaft, and electro-magnetic selector shaft actuating means.

11. In a tuning system for a radio receiving set, which set includes a rotatable tuning element shaft; an electro-magnetic drive for the tuning element shaft, an energizing circuit for said electro-magnetic drive, a shaft controlled switch in said circuit arranged to be automatically opened by actuation of said shaft when said shaft reaches a given untuned position, whereby the rotation of the shaft is arrested, selective shaft stopping mechanism adapted to be set to stop the shaft in any one of a number of predetermined tuned positions when said shaft is rotating from said given untuned position, means operable when the shaft is in said given untuned position for setting said selective mechanism to stop the shaft, and a second energizing circuit for said electro-magnetic drive adapted to be closed to cause rotation of the shaft from said given untuned position to be finally arrested in accordance with the setting of said selective mechanism, said last mentioned circuit including a normally open switch automatically closed by virtue of setting of the selective mechanism.

12. In a tuning system for a radio receiving set, which set includes an adjustable tuning element shaft; a motor for driving said tuning element shaft, an energizing circuit for said motor including a shaft controlled switch open when the shaft reaches a given untuned position, selector mechanism adapted to be moved from a normal position successively to positions where it will stop rotation of the tuning element shaft in any one of a plurality of positions, another energizing circuit for the tuning element shaft drive motor including a normally open control switch automatically closed whenever the selector mechanism leaves normal position, electro-magnetic means for setting the selector mechanism, and a circuit for that means including a normally open switch automatically closed by the tuning element shaft when said shaft reaches said given untuned position.

13. In a tuning system for a radio receiving set, which set includes an adjustable tuning element shaft; a reversible electro-magnetic driver for the shaft, means automatically controlled by shaft position to reverse the driver at two predetermined positions of the shaft, a circuit for the electro-magnetic driver, and a switch controlling that circuit and opened by rotation of the shaft when it reaches one of said predetermined shaft positions.

14. In a tuning system for a radio receiving set, which set includes an adjustable tuning element shaft; reversible means for rotating said shaft, said means including an electro-magnetic driver and an electrical circuit therefor, a manual switch for closing said circuit, means controlled by shaft position for reversing the direction of the shaft driver when the shaft has reached one predetermined position, and for again reversing the direction of the shaft driver when the shaft has reached another predetermined position, a switch in the circuit of the shaft driver automatically opened when said shaft reaches the last mentioned predetermined position, a plurality of stop elements on the shaft, a corresponding plurality of selector stops movable to be engaged by corresponding stop elements, manually controllable electro-magnetic means for moving said selector stops into operative stopping position, a second electrical circuit for the shaft driver not including the said automatically opened switch, and a switch controlling said last mentioned circuit.

15. In a tuning system for a radio receiving set, which set includes an adjustable tuning element shaft; means for rotating the shaft, a plurality of stop elements on said shaft, a selector shaft, a plurality of selector stops corresponding to said stop elements mounted on said selector shaft in angularly spaced relation, and step-by-step means for rotating the selector shaft to carry the selector stops successively to position to be engaged by the corresponding stop elements on the rotating tuning element shaft.

16. In a tuning system for a radio receiving set, which set includes an adjustable tuning element shaft; means for rotating the shaft, a plurality of stop elements on said shaft, a selector shaft, a plurality of selector stops corresponding to said stop elements mounted on said selector shaft in angularly spaced relation, and means for rotating the selector shaft to carry any one of the selector stops to operative position to be engaged by the corresponding stop on the rotating tuning element shaft.

17. In a tuning system for a radio receiving set, which set includes an adjustable tuning element shaft; electro-magnetic means for rotating the shaft, a plurality of stop elements on and rotating with said rotating shaft, said stops adjustable around said shaft, a corresponding plurality of selector stops, said selector stops movable to place any one stop in position to be engaged by and stop the corresponding one of the plurality of stop elements on the rotating tuning element shaft, a single selector stop moving member for selectively so operating said selector stops, an electro-magnetic device for operating said moving member, an electrical circuit for energizing the shaft rotating means, and a switch controlling said circuit.

18. In a tuning system for a radio receiving set, which set includes an adjustable tuning element shaft; electro-magnetic means for rotating the tuning element shaft, a plurality of stop elements on said rotating shaft, a corresponding plurality of selector stops movable successively to and from operative positions to be engaged by corresponding stop elements on the rotating tuning element shaft, a single selector stop moving member for moving said selector stops successively to and from operative position, an electro-magnetic device for so operating said moving member, an electrical circuit for energizing the shaft rotating means, and a switch controlling said circuit.

19. In a tuning system for a radio receiving set, which set includes an adjustable tuning element shaft; electro-magnetic means for rotating the shaft, a plurality of stop elements on said shaft, a corresponding plurality of selector stops movable selectively to operative position to be engaged by corresponding stop elements, magnetically actuated ratchet means for so moving said selector stops, means urging said selector stops toward inoperative position, means for controlling said ratchet means, a detent in association with the ratchet means and acting to prevent return of the selector stops from operative position, and means for releasing said detent by virtue of engagement of a stop element with a selector stop.

20. In a tuning system for a radio receiving set, which set includes an adjustable tuning element shaft; electro-magnetic means for rotating said shaft, a plurality of stop elements on and rotating with said shaft, a corresponding plurality of selective stop devices adapted to coact with said stop elements to stop rotation of the shaft, said stop devices adapted to be moved to operative position for such coaction, a single moving member for selectively so moving said devices, and an electro-magnetic device for operating said moving member.

21. In a tuning system for a radio receiving set, which set includes an adjustable tuning element shaft; electro-magnetic means for rotating said shaft, a plurality of stop elements on and rotating with said shaft, a corresponding plurality of selective stop devices adapted to coact with said stop elements to stop rotation of the shaft, said stop devices adapted to be moved successively to operative positions for such coaction, a single moving member for so moving said devices, and an electro-magnetic device for operating said moving member.

22. In a tuning system for a radio receiving set, which set includes an adjustable tuning element shaft; electro-magnetic means for rotating said shaft, a plurality of stop elements on and rotating with said shaft, a selector shaft, a plurality of selective stop devices angularly spaced on said selector shaft and adapted when moved to operative position to cooperate with corresponding stop elements on the tuning shaft to stop said shaft, and electro-magnetic means for rotating the selector shaft to carry the selective stop device successively to position to cooperate with the stop elements on the tuning element shaft.

23. In a tuning system for a radio receiving set, which set includes an adjustable tuning element shaft; electro-magnetic means for rotating said shaft, a plurality of stop elements on and rotating with said shaft, a like plurality of stop members adapted to move to engage corresponding tuning shaft carried stop elements to stop rotation of said shaft, a single selector member for acting successively on said stop members to cause them to move successively to operative stopping position, and an electro-magnetic means for so operating said selector member.

24. In a tuning system for a radio receiving set, which set includes an adjustable tuning element shaft; electro-magnetic means for rotating said shaft, a plurality of stop elements on and rotating with said shaft, a like plurality of stop members adapted to move to engage corresponding tuning shaft carried stop elements to stop rotation of said shaft, a selector shaft, a plurality of elements on said selector shaft adapted to act successively on said stop members to cause them to move to operative stopping position, and an electro-magnetic means for operating said selector shaft.

25. In a tuning system for a radio receiving set, which set includes an adjustable tuning element shaft; electro-magnetic means for rotating said shaft, a plurality of stop elements on and rotating with said shaft, a like plurality of stop members adapted to move to engage corresponding tuning shaft carried stop elements to stop rotation of said shaft, a selector shaft, a plurality of spirally arranged elements on said selector shaft adapted to act successively on said stop members to cause them to move to operative stopping position, and an electro-magnetic means for operating said selector shaft.

26. In a tuning system for a radio receiving set, which set includes an adjustable tuning element shaft; electro-magnetic means for rotating said shaft, a plurality of stop elements on and rotating with said shaft, a like plurality of stop members adapted to coact with said stop elements to stop rotation of the shaft, said stop members adapted to be moved to operative position for such coaction, a selector shaft, a plurality of elements on said shaft adapted to act on said stop members to cause them to move to such operative position one at a time, and an electro-magnetic means for operating said selector shaft.

WILLIAM P. CRILLY.